United States Patent [19]

McMahan

[11] Patent Number: 4,477,907
[45] Date of Patent: Oct. 16, 1984

[54] LOW POWER ARGON-ION GAS LASER

[75] Inventor: William H. McMahan, Salt Lake City, Utah

[73] Assignee: American Laser Corporation, Salt Lake City, Utah

[21] Appl. No.: 374,472

[22] Filed: May 3, 1982

[51] Int. Cl.³ .............................................. H01S 3/03
[52] U.S. Cl. ........................................ 372/64; 372/55;
372/97; 372/61; 372/99; 372/108
[58] Field of Search .................. 372/64, 55, 61, 98,
372/99, 108, 62, 34, 107, 97

[56] References Cited

U.S. PATENT DOCUMENTS

| | | | |
|---|---|---|---|
| 3,428,914 | 2/1969 | Bell | 372/61 |
| 3,763,442 | 10/1973 | McMahan | 372/61 |
| 3,961,283 | 6/1976 | Abrams et al. | 372/64 |
| 4,380,077 | 4/1983 | McMahan | 372/61 |
| 4,385,390 | 5/1983 | McMahan | 372/61 |

Primary Examiner—William L. Sikes
Assistant Examiner—Léon Scott, Jr.
Attorney, Agent, or Firm—B. B. Olive

[57] ABSTRACT

An argon-ion laser achieves low output power by using a plasma guide and mirror configuration which restricts lasing action to a portion of the resonator cavity at relatively high conversion efficiency.

10 Claims, 9 Drawing Figures

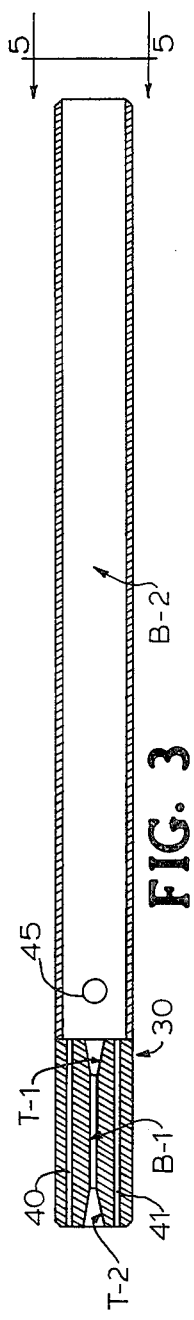
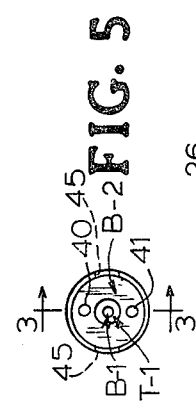
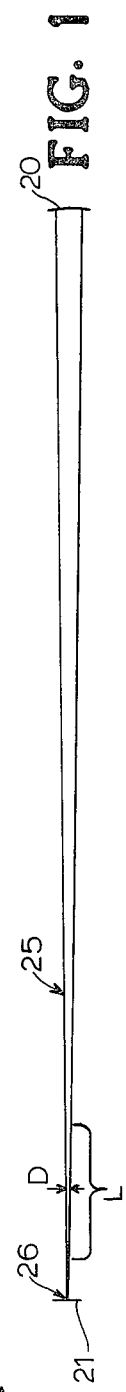
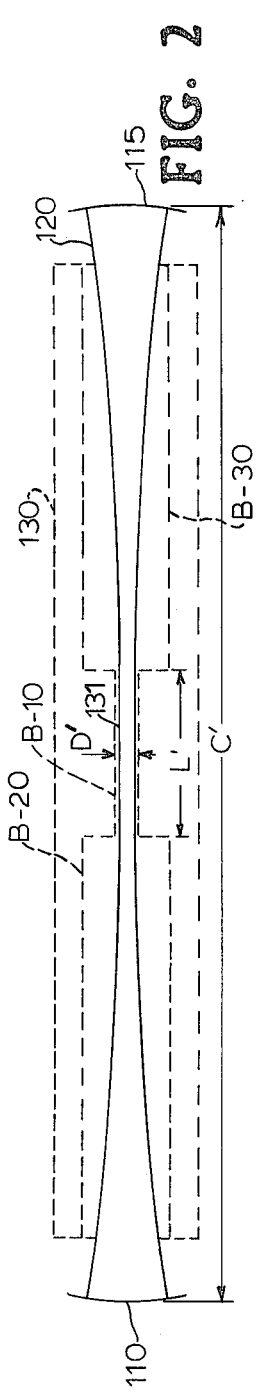

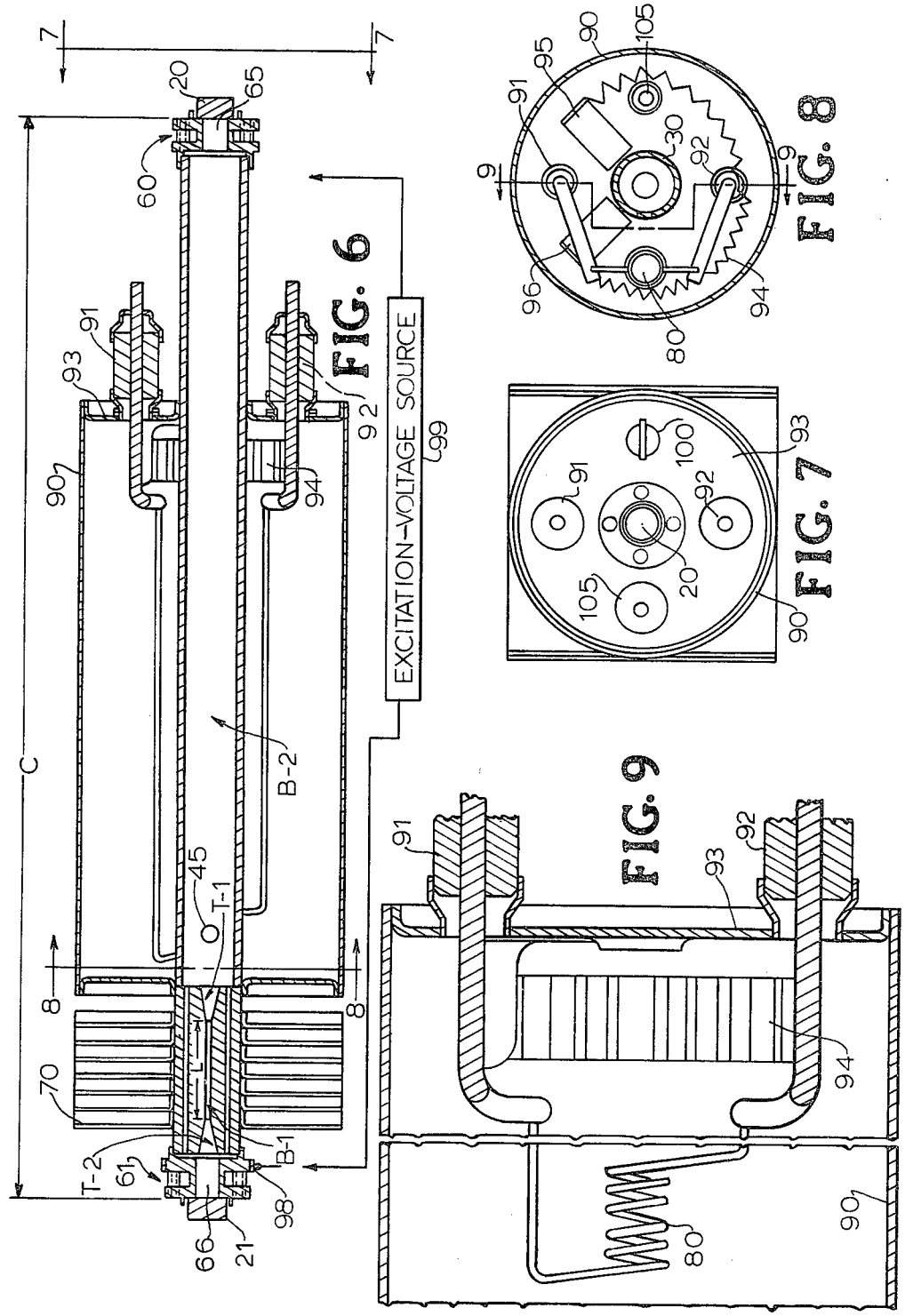

LOW POWER ARGON-ION GAS LASER

DESCRIPTION

1. Technical Field

The invention relates to gas lasers and more specifically to argon-ion gas lasers operable at relatively low output power to produce a substantially blue light.

2. Background Art

With the advent of modern mass-produced printing and lithographic apparatus particularly involving multicolor printing, there has arisen a need for a relatively inexpensive laser source capable of operating at relatively low output power and heat dissipation and which is productive of primarily blue light. Even though relatively inexpensive, low power, output laser sources of light in colors other than blue have been available, a similar laser source of blue light has not been available. In an argon-ion laser productive of blue light, the typical relatively large bore argon-ion laser operates at relatively high output power, e.g., 20 mw-10 w. While it is known to operate a large bore argon-ion laser at a low current level to achieve a reduced output power the typical argon-ion laser does not lend itself to operating at low output power because the bore current density does not provide an acceptable conversion efficiency, i.e., efficient conversion of input power to laser light output.

With the objective in mind of providing a relatively inexpensive, low-power laser source of blue light for the printing industry, it is also recognized that currently available argon-ion lasers are inherently characterized by external mirror structures, tube bore and beam configurations, which make currently-available argon-ion lasers unsuited either in terms of manufacturing cost or operating disadvantage to achieving the desired relatively inexpensive low power laser source of blue light for the printing industry.

As one aspect of the invention, the mirror structure is integrated with the tube structure. As background art, reference is made to pages 43–44 of the book "An Introduction to Lasers and Masers", (1971) A. E. Siegman, McGraw-Hill Book Company, which shows a set of flat mirrors which are properly oriented and then cemented in place and incorporated as part of the resonator in an inexpensive He-Ne, relatively low output power gas laser.

Another aspect of the invention relates to use of an ultra small, e.g., 1 millimeter or less diameter, laser bore conforming to the laser beam proximate the waist. Since one object of the invention is that of using an ultra-small bore as a means for reducing the power required to achieve lasing, it should be noted that U.S. Pat. No. 3,464,025 refers to reducing the bore diameter to reduce the total current required. The typical relatively high power argon-ion laser utilizes a uniform bore diameter within the range of 1–4 mm.

While other examples of gas lasers having tubes in which the bore is relatively small might be cited, it has not been heretofore known so far as applicant is aware to conform an ultra small size tube bore to a portion of the laser beam proximate the waist as a means for confining the lasing action in a selected portion of an argon-ion gas laser tube and with relatively low power consumption and with a relatively high conversion efficiency to provide blue light at a relatively low power output.

DISCLOSURE OF THE INVENTION

The invention provides an improved argon-ion gas laser adapted to operate with relatively low power output, provide a relatively low cost construction and provide a source of blue light particularly suited to the needs of the printing industry.

The argon-ion gas laser of the invention is characterized by employment of a plasma guide tube having a bore at least a portion of which is preferably of ultra small size and shaped to conform to the beam shape proximate the beam waist so as to permit the lasing action primarily in a portion of the bore of substantially reduced diameter and with substantially reduced output power as compared to the conventional argon-ion gas laser.

In the embodiment illustrated by way of example, a nearhemispherical resonator cavity is provided. An ultra-small bore provided in the tube conforms in shape to a portion of the beam envelope near the waist and is substantially entirely used to sustain the lasing action.

Other advantages are achieved, both with respect to manufacturing cost and operation, by integrating the mirror structures with the resonant cavity structure thereby eliminating the need for external mirrors and external mirrormounting apparatus.

DESCRIPTION OF THE DRAWINGS

FIG. 1 diagramatically illustrates a hemispherical mirror system useful for the invention.

FIG. 2 diagramatically illustrates a confocal mirror system also useful for the invention.

FIG. 3 is a cross-sectional view of a plasma guide tube used in a preferred embodiment of the invention and taken substantially along line 3—3 of FIG. 5.

FIG. 4 is an elevation view of the FIG. 3 guide tube.

FIG. 5 is an end view of the FIG. 3 guide tube taken in the direction of line 5—5 of FIG. 3.

FIG. 6 is a cross-sectional view of an argon-ion laser system according to the invention.

FIG. 7 is an end view taken in the direction of lines 7—7 of FIG. 6.

FIG. 8 is a cross-sectional view taken along line 8—8 of FIG. 6.

FIG. 9 is an enlarged fragmentary cross-sectional view of the cathode end of the laser system shown in FIG. 6 taken along line 9—9 of FIG. 8 with the tube being eliminated for purposes of simplification.

BEST MODE FOR CARRYING OUT THE INVENTION

The invention is illustrated and described as applied to an argon-ion laser from which those skilled in the art will appreciate application to other types of lasers particularly of the ion-gas type.

Making reference to the drawings, FIG. 1 schematically illustrates a hemispherical mirror system having a curved, partially transmitting mirror 20 and a flat mirror 21 which produces a laser beam 25 with the beam waist 26 located on the surface of the flat mirror 21. The essence of the invention is directed to forming the plasma guide tube bore to substantially conform with the profile or envelope of the beam 25 over a predetermined distance L of ultra-small bore size, e.g., 1 mm diameter, and to provide the remaining length of the plasma guide tube bore with an internal diameter substantially larger than the profile of the beam 25. In this manner, the current density promotes lasing action substantially entirely over the distance L where a relatively high current density is achieved.

In order to achieve the desired current density distribution within the tube bore, the plasma guide tube 30 illustrated in FIGS. 3 and 4 is formed with an ultra-small size bore B-1 extending for a minor portion of the length of the tube 30, and a larger bore B-2 extending for a major portion of the length of tube. Bore B-1 is provided with tapers T-1, T-2 at the ends thereof. Taper T-1 in particular serves to stabilize the plasma at the anode end. Bore B-1 purposely conforms precisely or at least substantially conforms to the shape of beam 25 over length L. Segmented or non-segmented tube construction may be employed according to established practices.

Prior to discussing the invention construction in more detail, it should be noted that the tube mounting, power and voltage sources, and other construction details not related specifically to the invention generally follow the construction previously employed in the Model 60B argon-ion laser marketed by the American Laser Corporation of Salt Lake City, Utah. Therefore, only those features departing from conventional argon-ion laser construction being used by way of example will be dealt with in sufficient detail to explain the invention.

Tube 30 will also be noted as having a pair of gas return bores 40, 41 oriented in a 180° relation and extending throughout that portion of tube 30 containing bore B-1. A transverse gas access hole 45 provides an electron flow path between cathode 80 and the central bore B-2. Power loss in bore B-2 is minimized by locating access hole 45 proximate the inner end of bore B-1 as illustrated. Appropriate metal coating is applied to the outer surface of tube 30 as indicated at 50–54 and is employed for establishing appropriate electrical conducting surfaces similar to the practices previously employed for the mentioned Model 60B laser. Tube 30 is typically made of beryllia (BeO) throughout its length to achieve good heat conductive properties in the tube. However, tube 30 may be formed partially of beryllia in the finned length of tube 30 operating at the highest temperature, i.e., over length L, with a less expensive material, e.g., alumina($Al_2O_3$), being brazed or fritted to the beryllia section for the remaining non-finned length of tube 30 where lesser temperatures are experienced during normal laser operation.

The resonator cavity is completed by means of adjustable metal mirror mounts 60, 61 which mount the respective reflecting and partially transmitting mirrors 20, 21 and also act as a means for sealing the ends of the resonator cavity formed by the interconnected, axially-aligned bores B-1, B-2, and the respective voids 65, 66 immediately in front of the respective mirrors 20, 21. The mirror mounts 60, 61 are appropriately adjusted for the desired orientation and are brazed to the ends of tube 30. Mirror mount 61 serves as the anode 98 with electrical connection to an appropriate voltage supply, generally designated by numeral 99.

As previously mentioned, the portion L of beam 25 within tube 30 and extending out from the beam waist 26 on the flat mirror 21 is substantially fitted to the ultra-small bore B-1 with the remainder of the beam 25 being enclosed by bore B-2 which surrounds beam 25 in a spaced relation. In this manner, the desired current density sufficient to sustain the lasing action is established only over the length L within bore B-1 with the current density in bore B-2 being intentionally held below the level required to support lasing.

In one embodiment, the overall cavity length C, i.e., mirror-face-to-mirror-face, was approximately 20 cm, the length of bore B-1 was 25 mm, the length of bore B-2 was 14.6 cm and tapers T-1, T-2 had a length of 6.4 mm. B-1 had a uniform diameter of approximately 0.76 mm and bore B-2 had a uniform diameter of 6.4 mm. Curved, partially-transmitting mirror 21 had a radius selected such that beam 25 substantially fitted bore B-1 and was located in spaced relation to B-2. In this same embodiment, the reflecting surface of the flat mirror 21 was spaced 5 mm from the anode end of tube 30. This spacing was found desirable as a means of preventing electron ion bombardment of the surface of flat mirror 21 and was consistent with the anode standoff potential. A gas pressure of approximately 1 Torr was maintained with a supply of argon gas. The operating current was held within a range of 2 to 5 amps and the cathode-to-anode voltage was within a range of 50–60 volts and with the satsifactory result of achieving a substantially low output power source of blue light for the mentioned printing applications with the output power being within the range of 2 mw to 10 mw.

To continue with the general description, a plurality of fins 70 formed of OFHC sheet copper are brazed to the bore and are disposed for transverse cooling. While not shown in detail, the mentioned fins 70 are preferably metal stamped sheets with substantial portions of the metal being physically separated from other portions and with holes at the points of separation so as to provide a substantially large radiating area to remove heat radially and axially and also substantially uniformly to minimize bending of the bores. In this regard, it is recognized that the bore B-1 in which substantially all of the lasing action takes place is situated at the extreme anode end of the tube. Thus, the heat cannot all be taken out radially and provision is thus made for axial flow as well as radial flow and for such purpose the fins 70 are brazed for some distance down the length of the tube 30. Since the invention permits a relatively low power density, a moderate to low cooling flow rate provides adequate cooling.

A coaxial header assembly is employed for housing the cathode. In this regard, it will be noted that cathode 80 in the form of a coil made of a suitable tungsten matrix is mounted within a cylindrical gas storage container 90. The axis of cathode 80 is offset from the axis of tube 30 whereas container 90 is coaxial with tube 30. The previously-mentioned access hole 45 is confined within container 90 and communicates the interior of container 90 with the large bore B-2 as an electron flow path, as previously mentioned. The coaxial cathode-mounting arrangement eliminates direct line of sight contamination of the optics by evaporants from the cathode.

Cathode lead-in supports 91, 92 mounted in header cup 93 are employed and follow the construction similar to that employed in the previously-mentioned Model 60B laser. A conventional getter strip 94 is supported by brackets 94, 96 within container 90 as illustrated. In addition to being offset from the axis of tube 30, it will also be noted that cathode 80 is located proximate gas access hole 45 thereby enabling a discharge path to be established between cathode 80 and bore B-2 through the gas medium stored in container 90.

A conventional pinch-off gas filled tube generally designated by numeral 100 (FIG. 7) is provided. Also, while not shown in detail and not forming part of the present invention, the improved laser of the present invention also preferably includes a preignition electrode generally designated by numeral 105 mounted in header cup 93, the details of which are more fully explained in copending patent application Ser. No. 327,068, filed Dec. 3, 1981, entitled "Argon-Ion Gas Laser Cathode Construction".

From the foregoing, it will be appreciated that by using conventional starting and operating procedures for argon-ion lasers, i.e., conventional excitation-voltage, source-control means, such as for the mentioned Model 60B, and by utilizing the full bore volume of bore B-1 in the lasing process, a relatively low output power can be achieved and with the desired blue light beam being derived through the partially-transmitting mirror 20.

A bore current density equal to that used in relatively high output power argon-ion lasers is also achieved and with a conversion efficiency of the same order.

While the illustrated hemispherical mirror configuration and mirror-mounting arrangement has proven in practice to offer many operating advantages, it is recognized that the desired low output power and reduced lasing or mode volume can be achieved with other mirror configurations. FIG. 2 schematically illustrates, by way of example, a confocal mirror configuration comprised of mirrors 110, 115 productive of a confocal-shaped beam 120. At least one of mirrors 110, 115 is presumed to be partially transmitting. Tube 130, indicated in dashed lines is assumed to have a ultra-small, centrally-located, bore B-10 extending for the length L' on either side of the beam waist 131 and substantially conforming to the shape or envelope of beam 120 over this length. Tube 130 is also schematically illustrated as having outwardly-extending, larger bores B-20 and B-30 as outward and larger continuations of bore B-10. Bores B-20, B-30 are assumed to be substantially larger in size than the shape of beam 120 and mounted in spaced relation to beam 20. With the prior description in mind, and with a proper selection of dimensions, it can be seen that a substantially high current density can be established in bore B-10 for the length L' sufficient to support lasing action to the exclusive of any lasing action being established in bores B-20, B-30 because of current densities being below the level required to sustain lasing by reason of bores B-20, B-30 substantially exceeding the size of the laser beam 120.

With respect to the first embodiment illustrated in FIGS. 1 and 3–9, it will be appreciated that dimensions L and D effectively control the output power and that the ratio of the length of the small bore B-1 to the length of the resonator cavity C, i.e., L/C, should be small. Similarly, as to the second embodiment, the ratio L'/C' should likewise be small for the desired results.

The relative length of the tube bore shaped to fit the beam and in which the lasing action takes place relative to the remaining length of the plasma guide will vary with the mirror and geometry aspects of the laser employing the invention. It is also recognized that in some systems that portion of the beam in which lasing is not effected could be surrounded by and pass through guide structure, e.,g., a shroud, not constituting a second tube bore as illustrated in the drawings. Thus, the second bore B-2 could effectively be established by a shroud and the first bore B-1 by a tube bore. In either case, the lasing action in the plasma guide would take place in an ultra-small tube bore substantially conforming to the beam envelope for a portion of the full length of the beam.

I claim:

1. A gas laser, comprising:
   (a) an active gaseous medium;
   (b) excitation means for exciting said active medium to produce optical laser radiation; and
   (c) an optical resonator confining said active medium, said optical resonator including optical means for effecting multiple reflections of optical laser radiation through said medium as a beam having a predetermined envelope, said resonator forming a plasma guide structure having a plasma guide tube with a first bore of selected diameter, said plasma guide structure having in axial alignment with and as a continuation of said first bore, a second bore of greater diameter than said first bore, the optical properties of said beam and the geometrical properties of said bores in conjunction with the current densities established within said bores being such that the portion of said beam envelope occupying said first bore substantially fills said first bore and said optical laser radiation is generated substantially entirely in said first bore.

2. A gas laser as claimed in claim 1 wherein both said bores are formed in said tube and said second bore is of greater length than said first bore.

3. A gas laser as claimed in claim 2 wherein said optical means produces a hemispherical-type resonator and said first bore is at one end of said tube and encloses a portion of the beam envelope established thereby extending inwardly from the beam waist thereof.

4. A gas laser as claimed in claim 2 wherein said optical means comprise adjustable mirrors on mounts fitted to opposite ends of said tube and serving to seal the outer ends of said bores.

5. A gas laser as claimed in claim 3 wherein said first bore is tapered outwardly at both ends thereof.

6. A gas laser as claimed in claim 4 including a hollow anode electrode forming a mount for one of said mirrors and surrounding said beam at the anode end thereof.

7. A gas laser as claimed in claim 6 wherein said mount is located at the outer end of said first bore.

8. A gas laser as claimed in claim 2 including gas storage means for storing a supply of said gaseous medium within said second bore.

9. A gas laser as claimed in claim 8 wherein said excitation means includes a cathode electrode axially offset from said second bore, said gas storage means includes a hollow container surrounding said second bore coaxial with said axis and said cathode electrode is positioned within said container proximate an aperture in said tube such that said gaseous active medium within said container is transferred to said second bore.

10. A gas laser as claimed in claim 9 wherein said aperture is located proximate the junction of said bores.

* * * * *